United States Patent [19]

Shiraishi et al.

[11] Patent Number: 4,854,634
[45] Date of Patent: Aug. 8, 1989

[54] UPPER BODY STRUCTURE FOR A CONVERTIBLE VEHICLE

[75] Inventors: Noriaki Shiraishi; Sigeru Kamiyama; Shigenori Amioka; Akiyoshi Okada, all of Hiroshima, Japan

[73] Assignee: Mazda Motor Corporation, Hiroshima, Japan

[21] Appl. No.: 103,060

[22] Filed: Sep. 30, 1987

[30] Foreign Application Priority Data

Oct. 2, 1986 [JP] Japan .................. 61-234760

[51] Int. Cl.⁴ .............................................. B60J 7/14
[52] U.S. Cl. .................... 296/108; 296/117; 296/122
[58] Field of Search .............. 296/107, 108, 116, 117, 296/121, 122

[56] References Cited

U.S. PATENT DOCUMENTS

| | | | |
|---|---|---|---|
| 1,184,734 | 5/1916 | Freeman | 296/107 |
| 1,940,444 | 12/1933 | Burgman | 296/107 |
| 2,007,873 | 7/1935 | Paulin | 296/117 |
| 2,596,355 | 5/1952 | Ackermans | 296/107 |
| 2,770,489 | 11/1956 | Garvey et al. | 296/117 |
| 2,812,975 | 11/1957 | Warner | 296/117 |
| 2,939,742 | 6/1960 | Dardarian et al. | 296/117 X |
| 3,575,464 | 4/1971 | Himka et al. | 296/117 |
| 4,700,982 | 10/1987 | Kuraoka et al. | 296/107 |
| 4,711,485 | 12/1987 | Maebayashi et al. | 296/108 |

FOREIGN PATENT DOCUMENTS

| | | | |
|---|---|---|---|
| 598400 | 12/1925 | France | 296/116 |
| 109506 | 9/1917 | United Kingdom | 296/108 |
| 159755 | 3/1921 | United Kingdom | 296/108 |

Primary Examiner—Dennis H. Pedder
Attorney, Agent, or Firm—Fleit, Jacobson, Cohn, Price, Holman & Stern

[57] ABSTRACT

A vehicle body structure having a passenger compartment and a roof structure covering the passenger compartment, the roof structure including a rigid front roof panel and a rigid rear roof panel which are connected together through a hinge mechanism. The rear roof panel is pivotably mounted on the rear body for swinging movement about a swinging axis. A linkage is provided so that when the rear roof panel is moved from an extended position where the roof structure covers the top portion of the passenger compartment to a retracted position wherein the roof panels are retracted into the rear body section, the front roof panel is folded over the rear roof panel with the inside of the front roof panel faced to the inside of the rear roof panel.

19 Claims, 18 Drawing Sheets

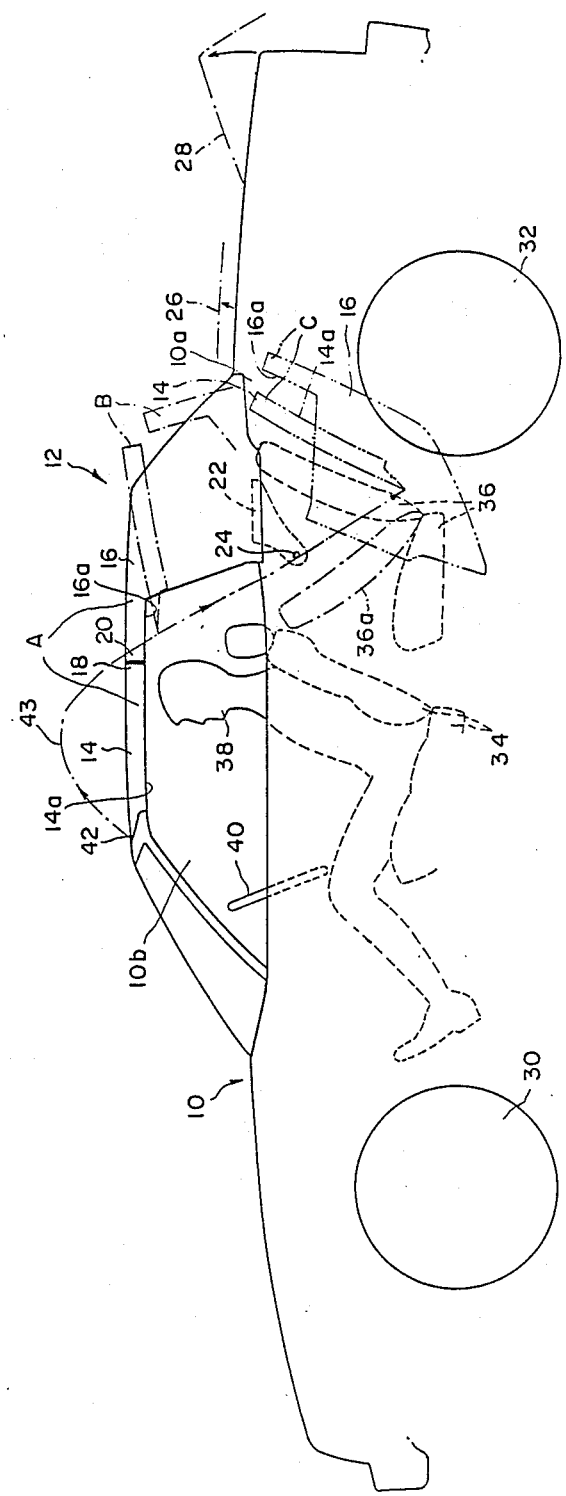

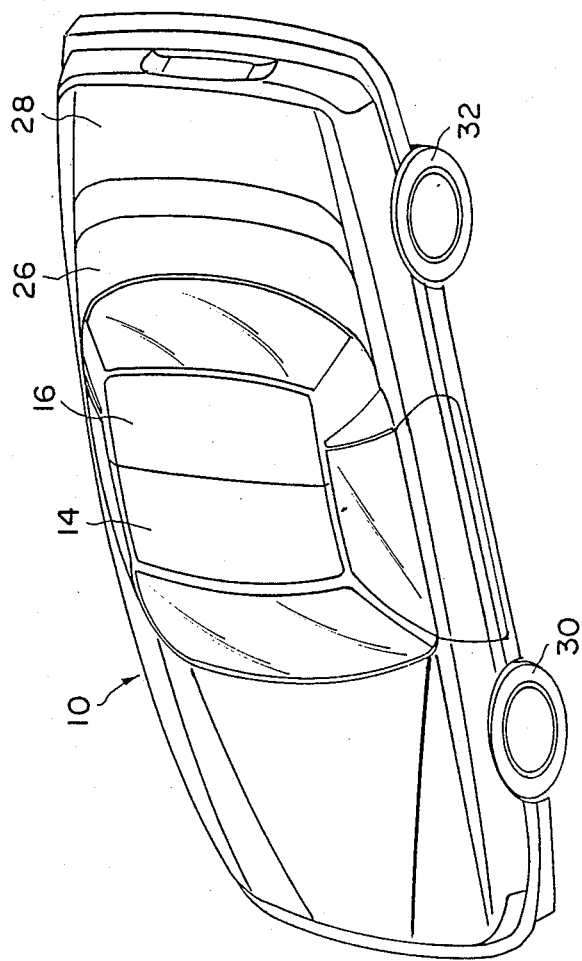

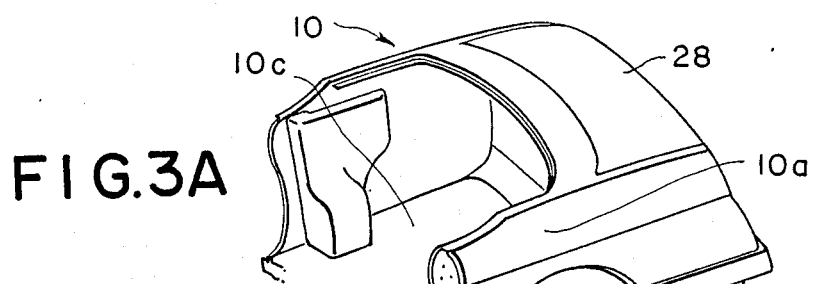
FIG.3A
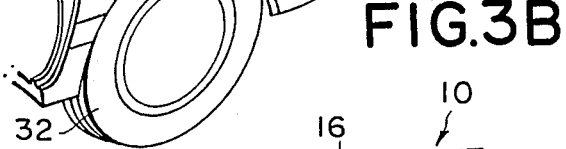
FIG.3B
FIG.3C
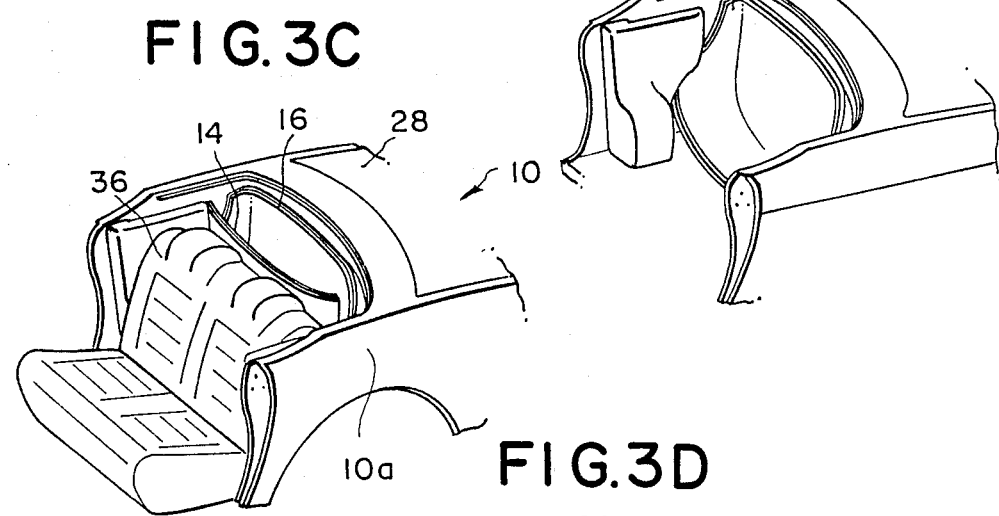
FIG.3D
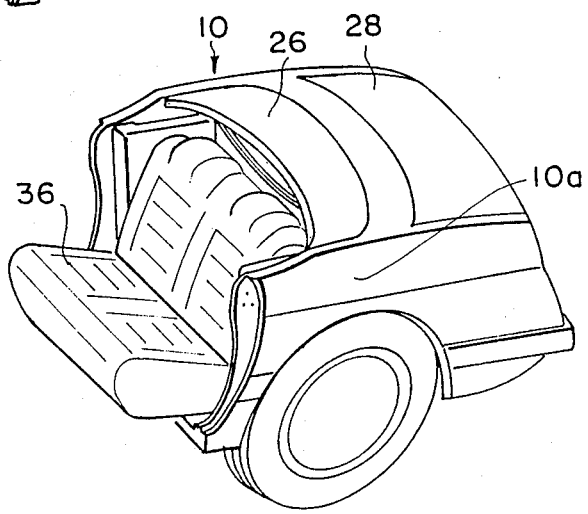

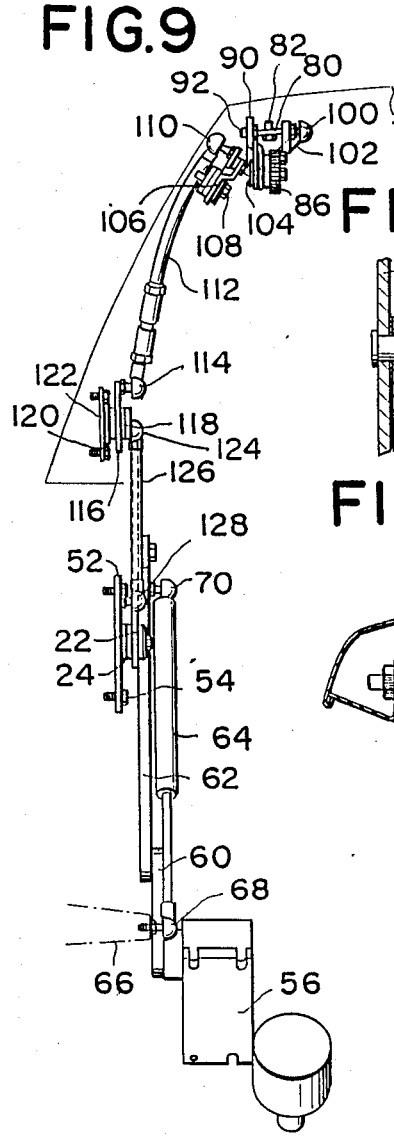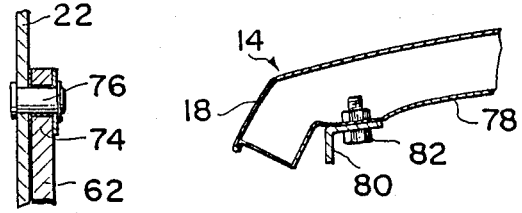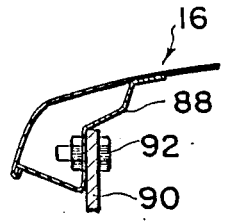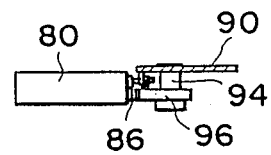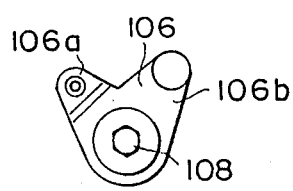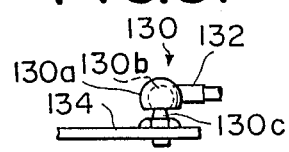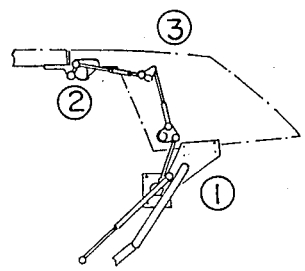

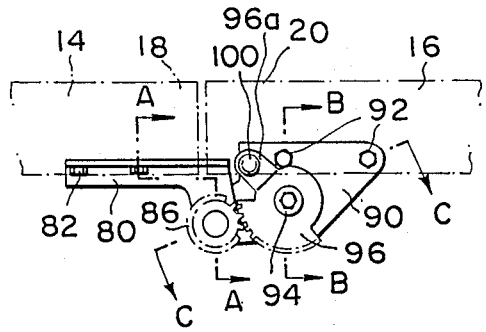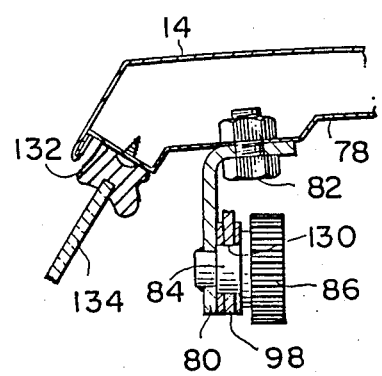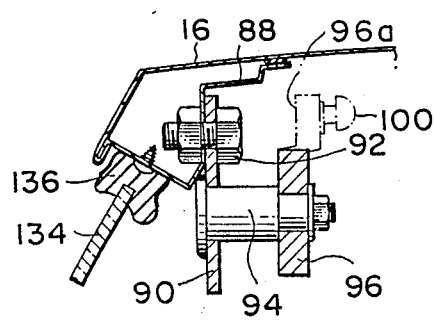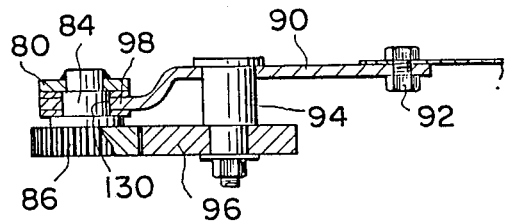

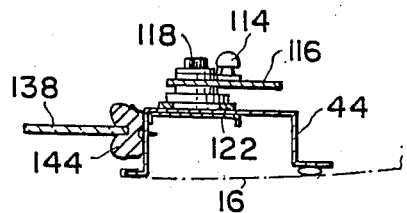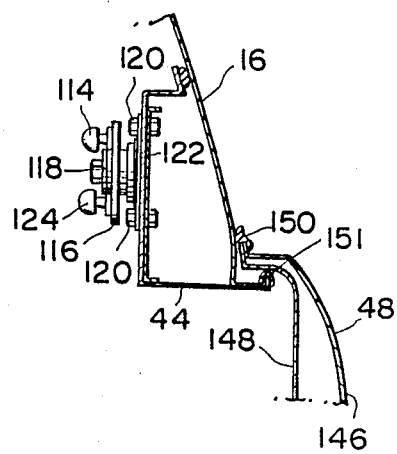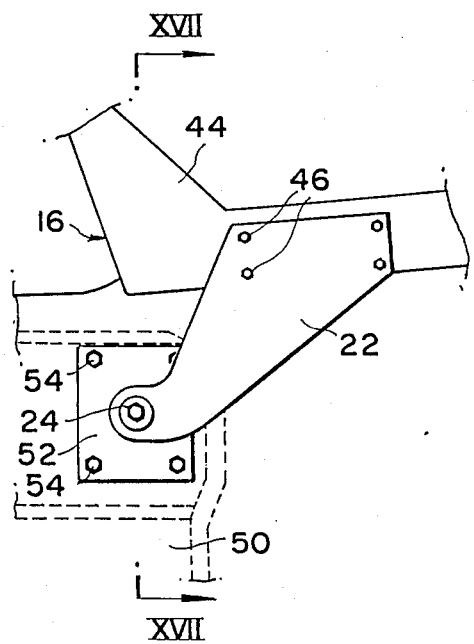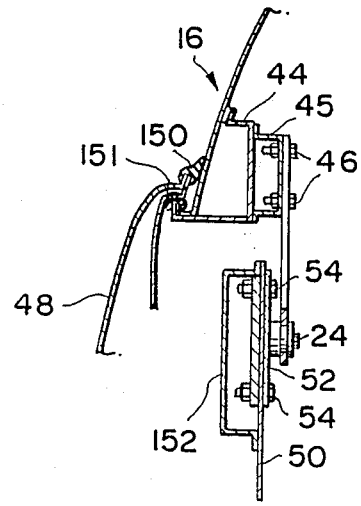

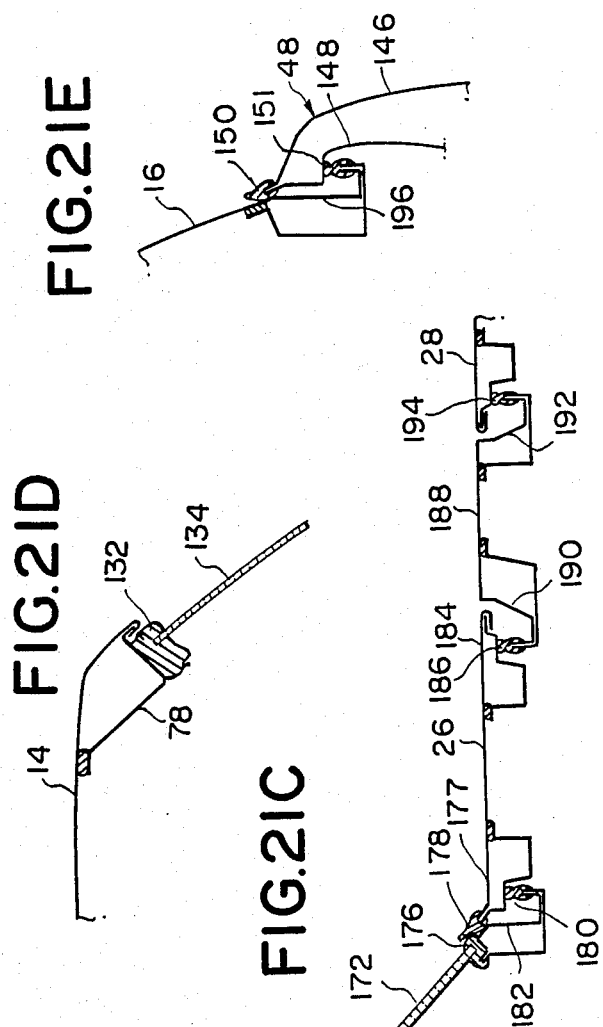

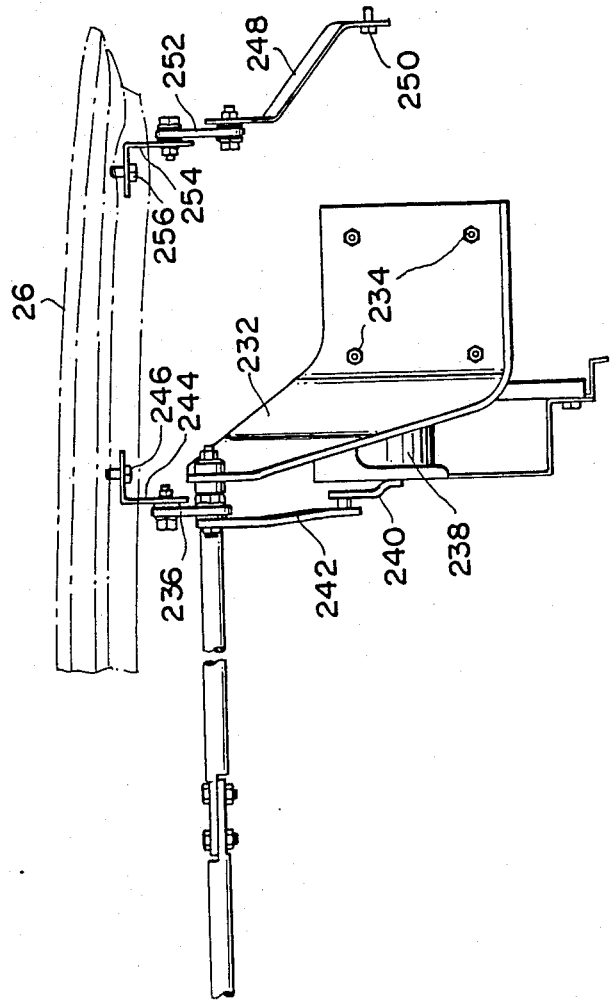

UPPER BODY STRUCTURE FOR A CONVERTIBLE VEHICLE

BACKGROUND OF THE INVENTION

1. Field of the Invention

The present invention relates to a vehicle body structure, and more particularly to a vehicle upper body structure. More specifically, the present invention pertains to a vehicle body structure of a convertible type in which the roof structure has a plurality of rigid roof panels which can be retracted into the rear body structure.

2 Description of the Prior Art

A convertible type vehicle body structure having a roof structure comprised of a plurality of rigid roof panels which are retractable into the rear body has already been
proposed for example by the U.S. Pat. No. 3,575,464. In the body structure proposed by the patent includes three roof panel sections, the front and intermediate roof panel sections being pivotably mounted on the vehicle body through a first linkage and the rear roof panel section being mounted through a second linkage. For retracting the roof panel sections, the rear roof panel section is at first swung rearwards to be moved away from the front and intermediate roof panel sections and the front and intermediate roof panel sections are then swung rearwards. During the rearward swinging movement of the front and intermediate roof panel sections, the front panel section is laid over the intermediate panel section so that the outer surface of the front panel section is opposed to the outer surface of the intermediate panel section, and the front and intermediate panel sections are retracted into the rear body section. Thereafter, the rear roof panel section is moved forward to the initial position.

The structure proposed by the patent is considered disadvantageous in that the front roof panel section is laid over the intermediate roof panel with the outer surface opposed to the outer surface of the intermediate roof panel section so that a large space is required for retracting the roof panel sections into the rear body section. It should further be noted that the proposed structure requires separate linkages for the front and intermediate roof panel sections and for the rear roof panel section so that a complicated actuating mechanisms are required for operating the roof structure between the extended position and the retracted position.

The U.S. Pat. No. 2,596,355 discloses a convertible vehicle body having separated front and rear roof panel sections which are retractable into the rear body section. The rear roof panel section is mounted on the vehicle body for swinging movement so that it can be retracted through a rearward swingable movement into the rear body section. The front roof panel section is mounted on a rail structure so that it is swingably moved rearwards from the extended position and than slidably moved downwards into the rear body section. The structure proposed by this patent is complicated and requires a space for allowing the front roof panel section to slidably move in the rear body section.

The U.S. Pat. No. 2,812,975 discloses a convertible vehicle body structure including a roof structure comprised of four rigid roof panel sections. This structure may have an advantage in that the roof panel sections can be retracted into a relatively small space in the rear body section. It should however be noted that the proposed structure is disadvantageous in that complicated mechanisms are required for moving the roof panel sections between the extended position and the retracted position. It should however be noted that in case where rear passenger seats are to be provided in the rear body section, it will be difficult to secure a space for retracting the roof panel sections into the rear body section.

SUMMARY OF THE INVENTION

It is therefore an object of the present invention to provide a convertible vehicle body structure having a roof structure including a plurality of rigid roof panel sections which can be retracted into the rear body section through a relatively simple mechanism.

Another object of the present invention is to provide a convertible vehicle body having roof panel structure of rigid panels which can be retracted into the rear body section in a relatively compact manner.

A further object of the present invention is to provide a convertible vehicle body in which the roof structure can be moved between the extended position and the retracted position even while the vehicle is running.

According to the present invention, the above and other objects can be accomplished by a vehicle body structure including a body having a passenger compartment and a rar body section, retractable roof means movable between an extended position wherein said roof means covers a top portion of the passenger compartment and a retracted position wherein the roof means is retracted into the rear body section, said roof means having a first rigid roof panel and a second rigid roof panel each having an inner side which is faced to said passenger compartment when the roof means is in said extended position, said first rigid roof panel being interconnected at a rear edge portion with a front edge portion of said second rigid roof panel through folding means, said second rigid roof panel being mounted on said body for swingable movement about a swingable axis, a linkage having one end connected with said body and the other end connected with said folding means so that said first rigid roof panel is swingably moved with respect to the second roof panel to have the inner side of the first roof panel opposed to the inner side of the second roof panel when the second roof panel is swingably moved in a rearward direction.

According to the features of the present invention, the first and second roof panels are interconnected by the folding means and the interconnecting linkage is provided to produce a movement in the first roof panel in response to a swingable movement of the second roof panel. The movement in the first roof panel is such that when the second roof panel is swingably moved in the rearward direction the first roof panel is swingably moved with respect to the second roof panel in such a direction that the inner side of the first roof panel is opposed to the inner side of the second roof panel. Thus, the movement of the roof panels are produced by a simple mechanism. It should further be noted that the roof panels can be retracted in a compact manner because the first and second roof panels are opposed to each other at the inner sides in the retracted position.

The above and other objects and features of the present invention will become apparent from the following descriptions of a preferred embodiment taking reference to the accompanying drawings.

BRIEF DESCRIPTION OF THE DRAWINGS

FIG. 1 is a diagrammatical illustration of an upper vehicle body structure in accordance with one embodiment of the present invention;

FIG. 2A is a perspective view showing the vehicle body structure in FIG. 1 with the roof panels in the extended position;

FIG. 3A is a perspective view of the rear body section;

FIG. 3B is a perspective view of the rear body section with the rear roof panel in the retracted position;

FIG. 3C is a perspective view showing the rear body section with the front and rear roof panels in the retracted position;

FIG. 3D is a perspective view of the rear body section with a rear deck cover placed over the front and rear roof panels retracted in the rear body section;

FIG. 8A is a sectional view taken along the line A—A in FIG. 7;

FIG. 8B is a sectional view taken along the line B—B in FIG. 7;

FIG. 8C is a sectional view taken along the line C—C in FIG. 7;

FIG. 8D is a view showing the relationship between the pinion and the sector gear;

FIG. 8E is a front view of a first joint bracket;

FIG. 8F is a view showing an arrangement of the ball

FIG. 8G is a diagrammatical view showing the order of adjustment;

FIG. 9 is a front view of the roof actuating mechanism;

FIG. 10 is a side view showing the arrangement of the pinion and the sector gear;

FIG. 11A is a sectional view taken along the line A—A in FIG. 10;

FIG. 11B is a sectional view taken along the line B—B in FIG. 10;

FIG. 11C is a sectional view taken along the line C—C in FIG. 10;

FIG. 15A is a sectional view taken along the line A—A in FIG. 14;

FIG. 15B is a view as seen in the direction of the arrow B in FIG. 14;

FIG. 16 is a side view showing the connection between the rear roof panel and the vehicle body;

FIG. 17 is a sectional view taken along the line XVII—XVII in FIG. 16;

FIG. 21C is a sectional view taken along the line C—C in FIG. 20;

FIG. 21D is a sectional view taken along the line D—D in FIG. 20;

FIG. 21E is a sectional view taken along the line E—E in FIG. 20;

FIG. 21F is a sectional view taken along the line F—F in FIG. 20;

FIG. 21G is a perspective view showing the details of the portion G in FIG. 20;

FIG. 21H is a sectional view taken along the line H—H in FIG. 21G;

FIG. 27 is a front view of the rear deck cover actuating mechanism.

DESCRIPTION OF THE PREFERRED EMBODIMENT

Figure 2B:
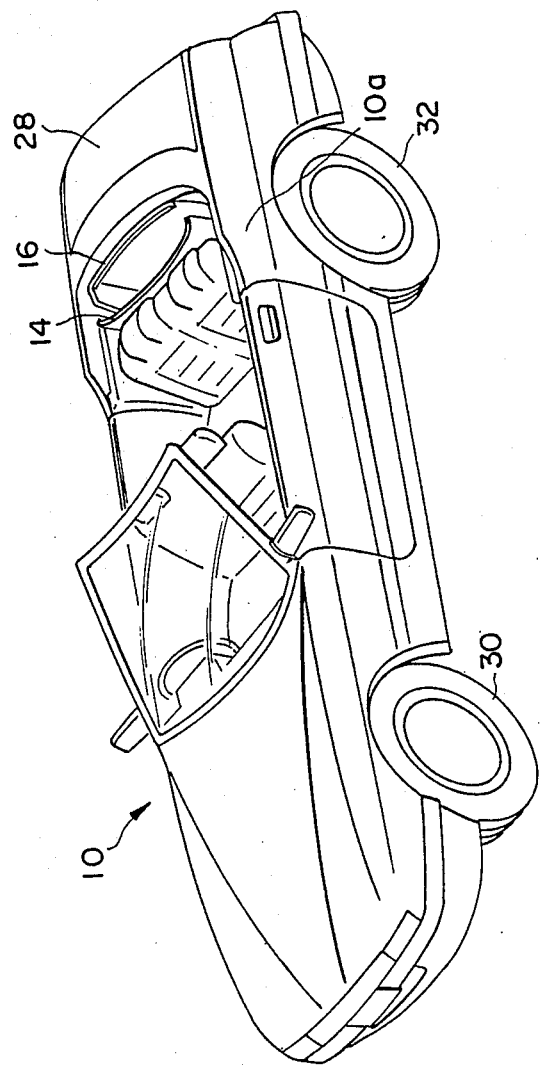
FIG. 2B is a perspective view showing the vehicle body structure in FIG. 1 with the roof panels in the retracted position.

Referring to the drawings, particularly to FIG. 1, it will be noted that the vehicle body 10 shown therein includes a roof structure 12 comprising a front or first rigid roof panel 14 and a rear or second roof panel 16 which are arranged in fore-and-aft relationship and movable between an extended position shown by solid lines in FIG. 1 and a retracted position shown by broken lines. As shown in FIG. 1, the rear roof panel 16 is provided at a lower portion on each side with a roof set bracket 22 which is pivotably connected with a side portion of a rear body section 10a of the vehicle body 10 for a pivotable movement about an axis 24. It will therefore be understood that the rear roof panel 16 is swingable with respect to the vehicle body 10 about the pivot axis 24. The vehicle body 10 is further provided with a rear deck cover 26 and a rear trunk lid 28 which are located rearwards the roof structure 12. The body is supported by front wheels 30 and rear wheels 32 as conventional in the art. In the body 10, there are provided front seats 34 and rear seats 36. A driver is shown by a reference numeral 38 and a steering wheel 40 is provided for the driver 38.

Before describing the detailed structures, general operations of the roof structure 12 will be described. The front roof panel 14 and the rear roof panel 16 are normally positioned in the extended positions as shown by solid lines in FIG. 1. In the positions, the roof structure 12 covers the top portion of the passenger compartment 10b in which the seats 34 and 36 are positioned for the passengers such as the driver 38.

When it is desired to move the roof panels 14 and 16 to the retracted positions, the panels are moved from the position shown by the solid lines to the positions shown by broken lines B and then to the positions shown by broken lines C in FIG. 1. In order to make possible such movements of the roof panels 14 and 16, the rear deck cover 26 is at first moved to a lifted position as shown by broken lines and the seat back of the rear seat 36 is folded forwards as shown by broken lines 36a. The rear roof panel 16 is swingably moved rearwardly about the pivot axis 24. The rearward swinging movement of the rear roof panel 16 is transmitted to the front roof panel 14 through a linkage which will be described later so that the front roof panel 14 is folded with respect to the rear roof panel 16 as shown by the broken lines B and then to the position shown by the broken lines C. In the position shown by the broken lines C, the front roof panel 14 is placed with respect to the rear roof panel so that the inner side which is the side faced to the passenger compartment 10b in the extended position is opposed to the inner side of the rear roof panel 16. In this course of movement, the front edge 42 of the front roof panel 14 is moved along the trace shown by a reference numeral 43.

Referring to FIG. 2A, the vehicle body 10 is shown with the roof panels 14 and 16 in the extended positions. In FIG. 2B, the vehicle body 10 is shown with the roof panels 14 and 16 retracted into the rear body section 10a. FIG. 3A shows the rear body section 10a which is provided with a space 10c for retracting the roof panels. In FIG. 3B, the rear roof panel 16 is shown in the position retracted in the space 10c in the rear body section 10a. FIG. 3C shows the front roof panel 14 as well as the rear roof panel 16 retracted into the rear body section 10a and the rear seat 36 is shown to show the position where the roof panels are retracted. FIG. 3D shows the rear deck cover 26 placed over the roof panels retracted in the rear body section 10a.

Figure 4:
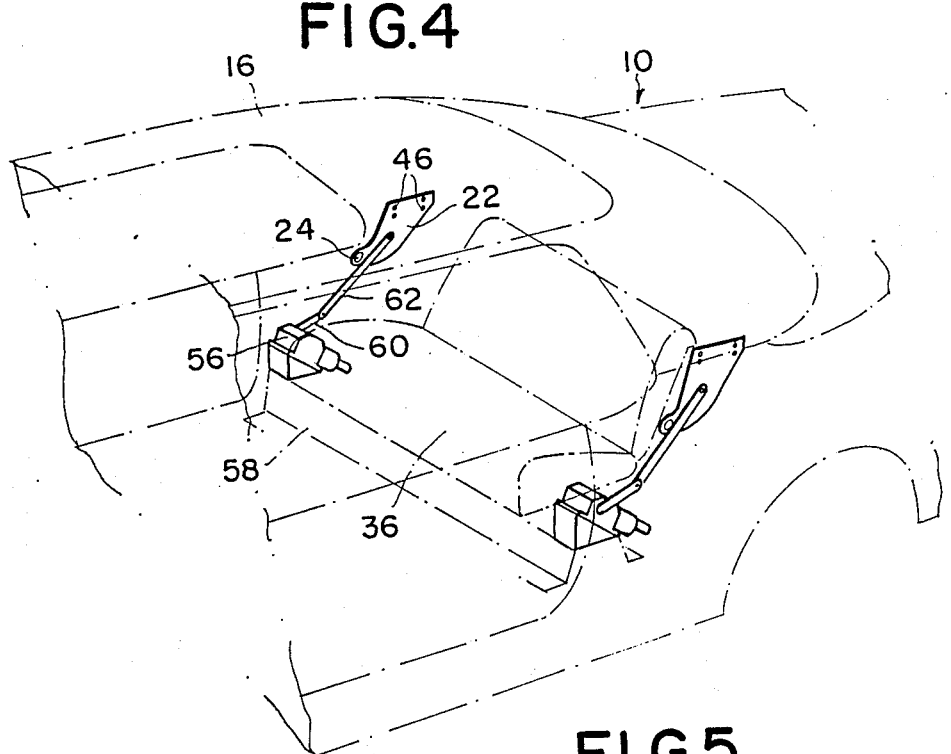
FIG. 4 is a perspective view showing the roof actuating mechanism.
Figure 6:
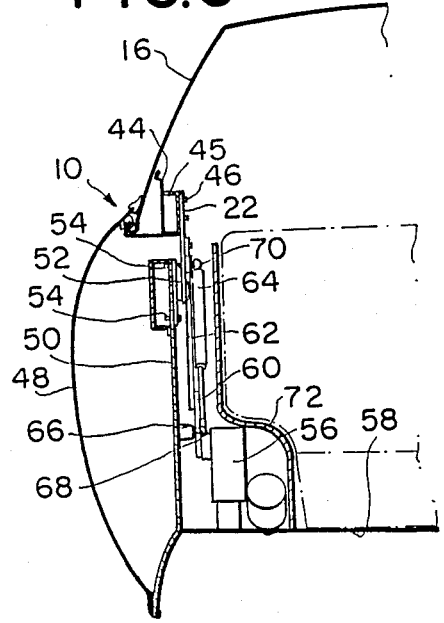
FIG. 6 is an end view of the roof actuating mechanism.
Figure 5:
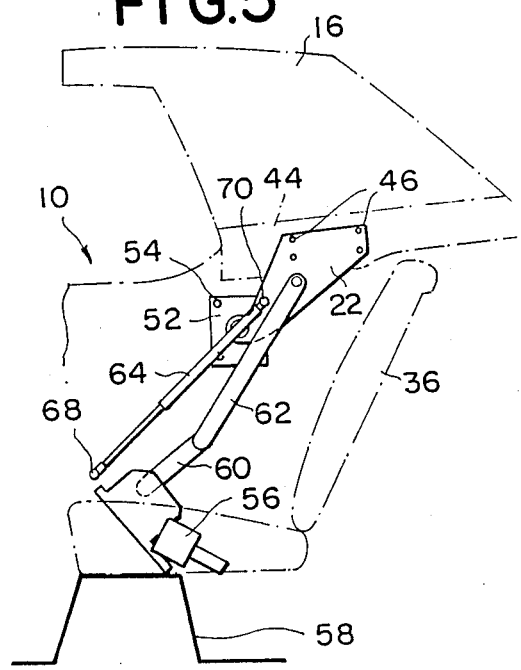
FIG. 5 is a side view of the roof actuating mechanism.

Referring now to FIG. 4 together with FIGS. 5 and 6, it will be noted that the rear roof panel 16 is provided at a lower portion on each side with a roof set bracket 22. More specifically, the rear roof panel 16 is provided at a lower peripheral portion with a roof inner member 44 and the roof set bracket 22 is secured at each side of the rear roof panel 16 to the roof inner member 44 by means of bolts 46.

The rear body section 10a of the vehicle body 10 includes a rear fender structure having a rear fender panel 48 and a quarter panel 50 located transversely inside the fender panel 48. A bearing bracket 52 is attached to the quarter panel 50 by means of bolts 54 and pivotably supports the roof set bracket 22 for swinging movements about the aforementioned pivot axis 24.

As shown in FIG. 4, the rear body section 58 includes a cross member 58 extending tranversely of the vehicle body 10. The cross member 58 supports an electric motor 56 at each side of the vehicle body 10 for driving the rear roof panel 16. The output shaft of the motor 56 is connected through a linkage including links 60 and 62 with the roof set bracket 22. There is provided an assist damper 64 which functions to assist the motor 56 in moving the rear roof panel 16 from the retracted position to the extended position. The assist damper 64 is connected at one end to the quarter panel 50 through a bearing bracket 66 on the quarter panel 50 and a ball joint 68 provided on the bearing bracket 66. The other end of the assist damper 64 is connected with the roof set bracket 22 through a ball joint 70. As shown in FIG. 6, the aforementioned mechanism for driving the rear roof panel 16 is covered by a trim cover 72.

When it is desired to move the roof panel 16 to the retracted position, the motors 56 are operated and the rotation of the motor output shaft is transmitted through the links 60 and 62 to the roof set brackets 22 to swingably move the rear roof panel 16 about the pivot axis 24 in the downward direction. Thus, the rear roof panel 16 is retracted into the rear body section 10a in the position rearward the rear seat 36. For moving the rear roof panel 16 to the extended position, the motors 56 are operated in the opposite direction. Since the assist damper 64 is located below the pivot axis 24, the compression force applied by the damper 64 to the roof set bracket 22 produces a moment about the pivot axis 24 in the direction of moving the roof panel 16 toward the extended position.

Figure 7:
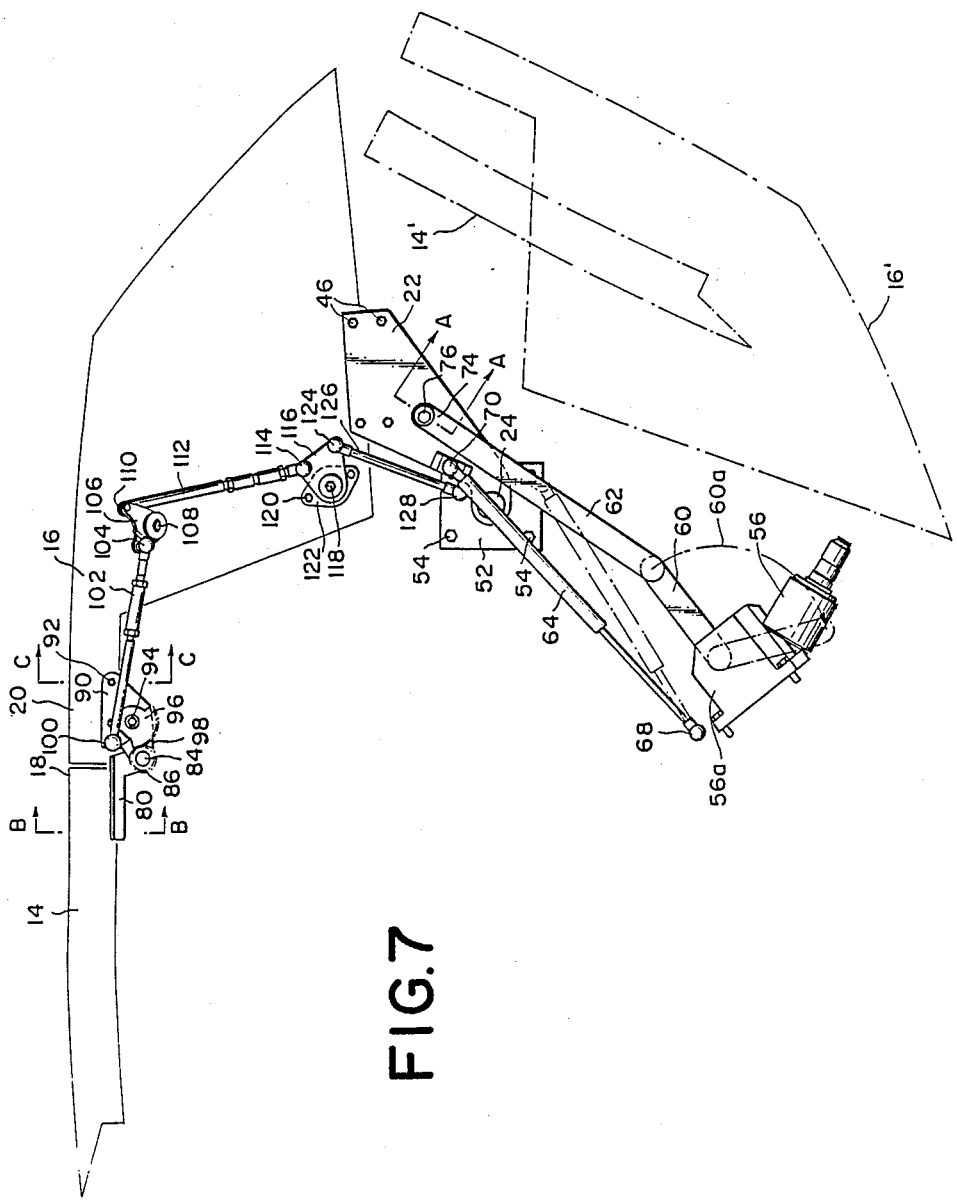
FIG. 7 is an enlarged side view of the roof actuating mechanism to show the details of the mechanism.

Referring to FIGS. 7 through 9, it will be noted that the output shaft of the motor 56 is connected with a speed reduction gear box 56a which has an output member connected with one end of the link 60. Thus, the link 60 is movable in the angular range shown by a broken line 60a in FIG. 7. The link 62 which is connected at one end with the link 60 is connected at the other end 74 with the roof set bracket 22 by means of a pivot pin 76 as shown in FIG. 8A.

As shown in FIG. 7, the front roof panel 14 has a rear edge portion 18. In FIG. 8B, it will be noted that the front roof panel 14 includes a roof inner panel 78 and at the rear edge portion of the front roof panel 14 a pinion bracket 80 is attached to the roof inner panel 78 by means of bolts 82. The pinion bracket 80 carries a pinion 86 through a pinion shaft 84. The pinion 86 is secured to the pinion shaft 84 which is in turn secured to the pinion bracket 80.

In FIG. 8C, it will be noted that the rear roof panel 16 is provided at a front edge portion with a roof inner panel 88 which carries a sector gear bracket 90 which is secured to the inner panel 88 by means of bolts 92. The sector gear bracket 90 has a pivot pin 94 which is secured to the bracket 90. A sector gear 96 is rotatably carried by the pivot pin 94. The sector gear bracket 90 has a forward extension 98 which receives the pinion shaft 84 for rotation. Thus, it will be noted that the front roof panel 14 and the rear roof panel 16 are pivotably connected through the brackets 80 and 90 and the pinion shaft 84. The sector gear 96 is engaged with the pinion 86 which is secured to the pinion shaft 94 on the bracket 80. It will therefore be understood that a rotation of the sector gear 96 produces a rotation in the pinion 86 to thereby cause a swinging movement of the front roof panel 14.

The sector gear 96 is connected through a ball joint 100 to one end of a first roof link 102 which is connected at the other end through a ball joint 104 with a first joint bracket 106. The first joint bracket 106 has two arms 106a and 106b as shown in FIG. 8E and the link 102 is connected with the arm 106a by means of the ball joint 104. The first joint bracket 106 is mounted on the rear roof panel 16 for swinging movement through a pivot pin 108. The other arm 106b of the first joint bracket 106 is connected with one end of a second roof link 112 through a ball joint 110. The second roof link 112 is connected at the other end with a second joint bracket 116 which is pivotably mounted on the rear roof panel 16 by means of a pivot pin 118 through a mounting bracket 122 which is secured to the rear roof panel 16 by means of bolts 120.

The second joint bracket is of a triangular shape and pivotably mounted at one corner of the triangle on the mounting bracket 122. The end of the second roof link 112 is connected to the bracket 116 at another corner of the triangle. The remaining corner of the triangle of the bracket is connected through a ball joint 124 with one end of a third roof link 126. The other end of the third roof link 126 is mounted through a ball joint 128 on the bracket 52 on which the roof set bracket 22 is mounted. It will noted that the position of the ball joint 128 is offset rearwards and upwards with respect to the pivot axis 24.

In the mechanism described above, the movement of the rear roof panel 16 is transmitted through the linkage comprising the links 102, 112 and 126 to the sector 96 to rotate the sector 96 in an angular extent corresponding to the amount of movement of the rear roof panel 16. More specifically, when the rear roof panel 16 is swingably moved rearwards about the pivot axis 24, the sector gear 96 is rotated about the pivot pin 94 clockwise to rotate the pinion counter-clockwise. Thus, the front roof panel 14 is swingably moved about the axis of the pivot pin 84 in the counter-clockwise direction so as to be folded over the rear roof panel 16 with the inner side of the front roof panel 14 faced to the inner side of the rear roof panel 16. When the rear roof panel 16 is retracted into the rear body section 10a as shown by broken lines 16' in FIG. 7, the front roof panel 14 is folded over the inside of the rear roof panel 16 as shown by broken lines 14' in FIG. 7.

FIG. 8F shows a typical example of a ball joint 130 which can be used for the previously described ball joints which are used for connecting the links 102, 112 and 126. The ball joint 130 is comprised of a pin 130c formed at an end with a spherical bearing 130b and a spherical socket 130a which is engaged with the spherical bearing 130b on the pin 130c. The pin 130c is secured to a bracket 134 and the socket 130a is connected to a link 132. In FIG. 7, the first link 102 and the second link 112 are shown as being adjustable in length. The linkage is assembled in the order as shown by (1), (2) and (3) in FIG. 8G. At first, the third link 126 is installed and then the first link 102 is installed. The length of the first roof link 102 is then adjusted with the roof panels 14 and 16 in the extended position. Thereafter, the second roof link 112 is installed and adjusted in length.

Referring now to FIGS. 10 through 17, particularly to FIGS. 10 and 11A, it will be noted that the the extension 98 of the sector gear bracket 90 is formed with a hole 130 and the pinion shaft 84 is inserted into the hole 130 so that the bracket 90 is swingable with respect to the pinion bracket 80. It should further be noted that the pinion shaft 84 is welded to the bracket 80 and the pinion 86 is integrally formed with the pinion shaft 84. FIG. 11B shows the detailed structure for mounting the sector gear bracket 90 on the rear roof panel 16. As shown in FIGS. 10 and 11B, the sector gear 96 is formed with an extension 96a and the first roof link 102 is connected with the extension of the sector gear 96 through the ball joint 100.

In FIGS. 11A and 11B, it will further be noted that the front roof panel 14 is provided at each side edge portion with a weather strip 132 and the rear roof panel 16 is provided at each side edge portion with a weather strip 136. The vehicle body has a side window panel 134 at each side and the side window panel 134 is engaged at the upper edge with the weather strips 132 and 136 when the side window panel 134 is closed. FIG. 11C shows in detail the engagement between the pinion 86 and the sector gear 96.

Figure 12:
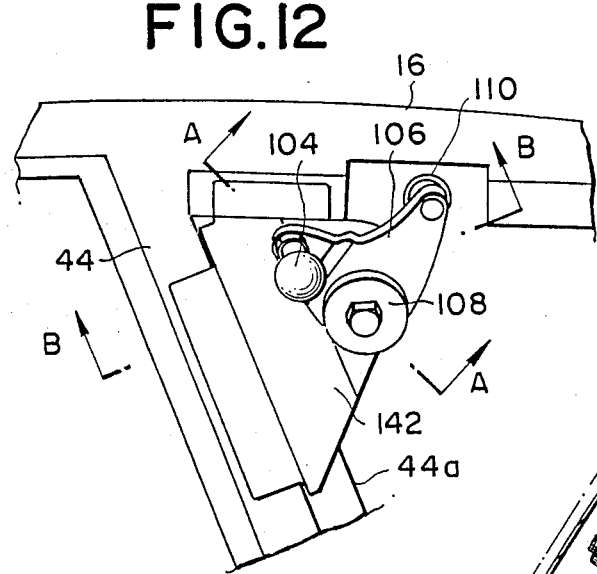
FIG. 12 is a view of the first joint bracket.
Figure 13A:
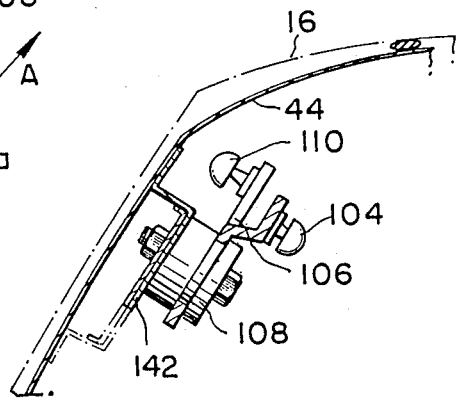
FIG. 13A is a sectional view taken along the line A—A in FIG. 12.
Figure 13B:
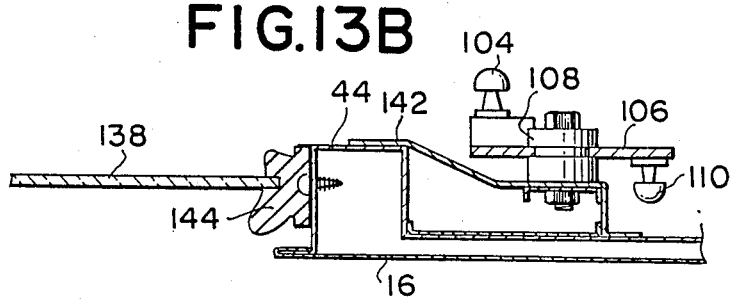
FIG. 13B is a sectional view taken along the line B—B in FIG. 12.

Referring now to FIG. 12 together with FIG. 13A, there is shown that the rear roof panel 16 has an inner panel 44 at each side portion. The inner panel 44 is formed with a window opening 44a and a transparent window glass 138 is attached to the inner panel 44 through a weather strip 144 as shown in FIG. 13B. A reinforcement 142 is attached to the inner panel 44 at a corner portion of the inner panel 44 and carries the pivot pin 108 for supporting the first joint bracket 106.

Figure 14:
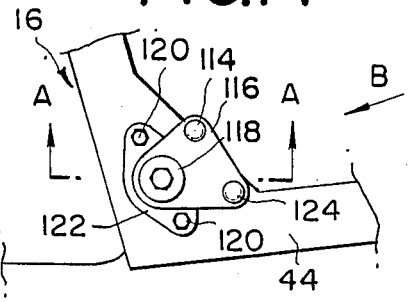
FIG. 14 is a view showing the second joint bracket.

As shown in FIGS. 14, 15A and 15B, the bracket 122 for carrying the second joint bracket 116 is also mounted on the inner panel 44 of the rear roof panel 16. It will further be noted in FIG. 15A that the inner panel 44 is provided with a weather strip 144 which is engaged with the window glass 138. As shown in FIG. 15B, the rear fender panel 48 includes an outer panel 146 and an inner panel 148 and is provided at an upper edge with a weather strip 150 which is adapted to be engaged with the outer surface of the rear roof panel 16. The rear roof panel 16 has a lower edge portion provided with a weather strip 151 which is adapted to be engaged with the inner panel 148 of the rear fender panel 48.

Referring to FIGS. 16 and 17, there is a bracket 45 which is attached to the inner panel 44 of the rear roof panel 16. The roof set bracket 22 is attached to the bracket 45 through the bolts 46. The quarter panel 50 is provided with a reinforcement 152 at a portion where the bracket 52 is attached to the quarter panel 50.

Figure 18:
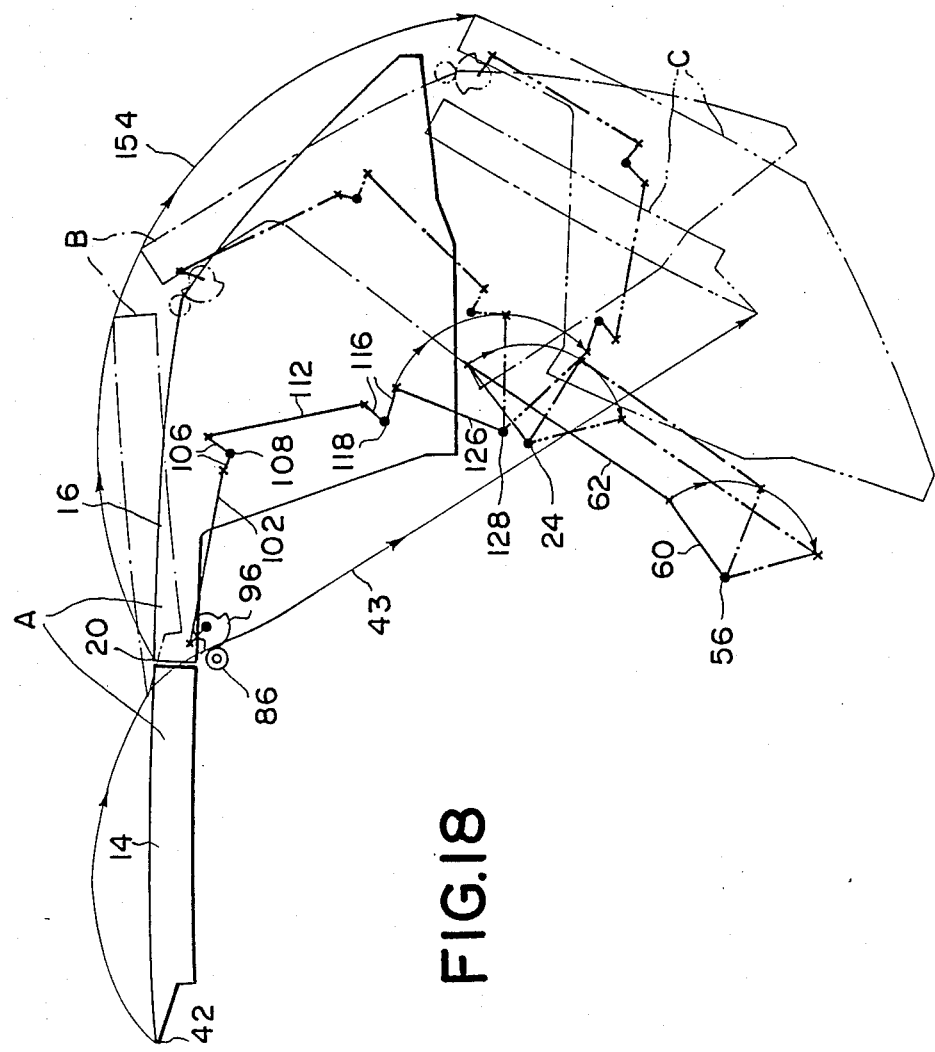
FIG. 18 is a side view showing the traces of movements of the front and rear roof panels.
Figure 19:
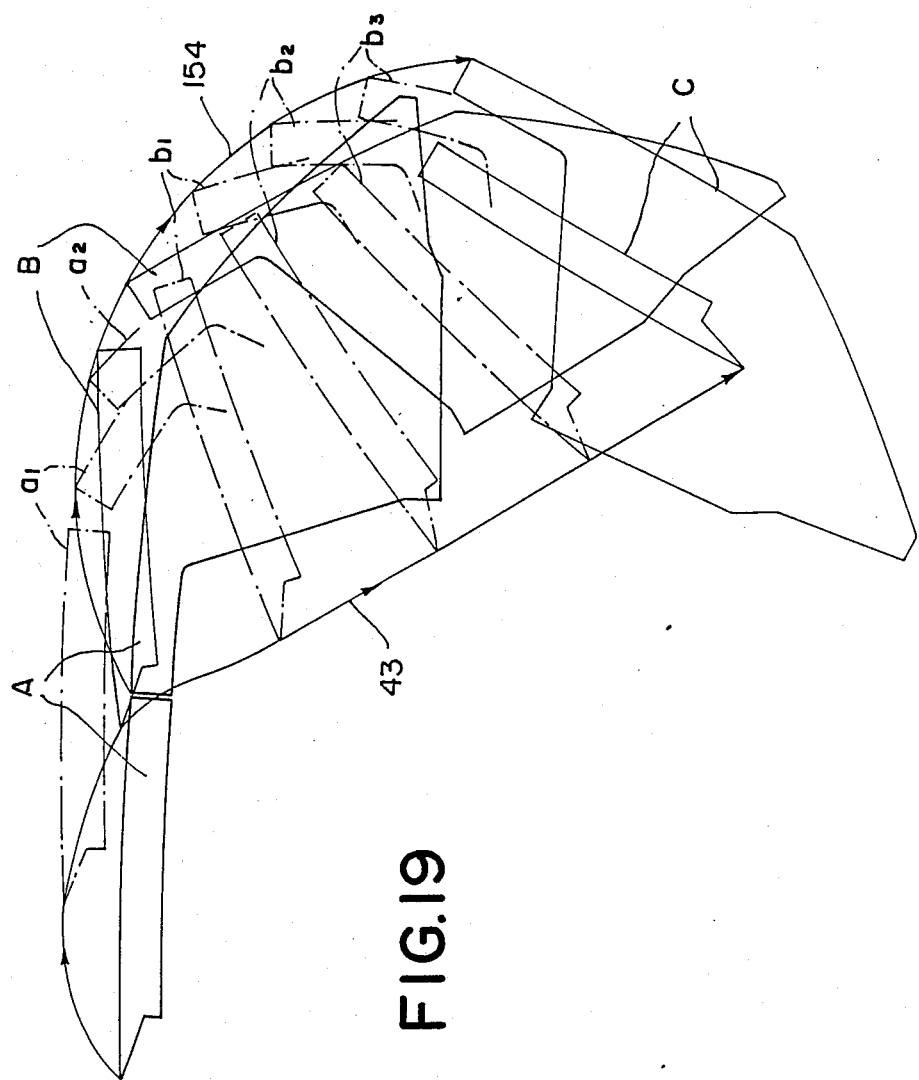
FIG. 19 is a view showing the movements of the front roof panel.

In FIGS. 18 and 19, there are shown the movements of the front roof panel 14 and the rear roof panel 16. The roof panels 14 and 16 are shown by solid lines A in the extended positions. As the rear roof panel 16 is moved toward the retracted position, the roof panels 14 and 16 are moved to the positions shown by broken lines a1 in FIG. 19 and then through the position shown by broken lines a2 to the position shown by broken lines B. By the broken lines a2, only the position of the rear roof panel is shown but it should be noted that the front roof panel 14 is in a position between the position a1 and the position B. Thereafter, the roof panels 14 and 16 are moved through the positions shown by broken lines b1, b2 and b3, respectively, to the retracted position shown by solid lines C. The trace of the movement of the front edge of the front roof panel 14 is shown by a line 43, whereas the trace of the front edge of the rear roof panel 16 is shown by a line 154. It will be understood that the movement of the front roof panel 14 is such that it is once lifted from the extended position and then moved down. Therefore, it is possible to maintain an adequate clearance between the passenger's head and the roof panel 14 when the roof panel 14 is being moved to and from the extended position. This movement is produced due to the arrangements as shown in FIG. 7 in which the third roof link 126 is substantially on a straight line passing through the axis 24. In other words, the ball joints 124 and 128 are aligned on a straight line passing through the axis 24. It is therefore possible to operate the roof panels 14 and 16 even when the passengers are in the passenger compartment.

Figure 20:
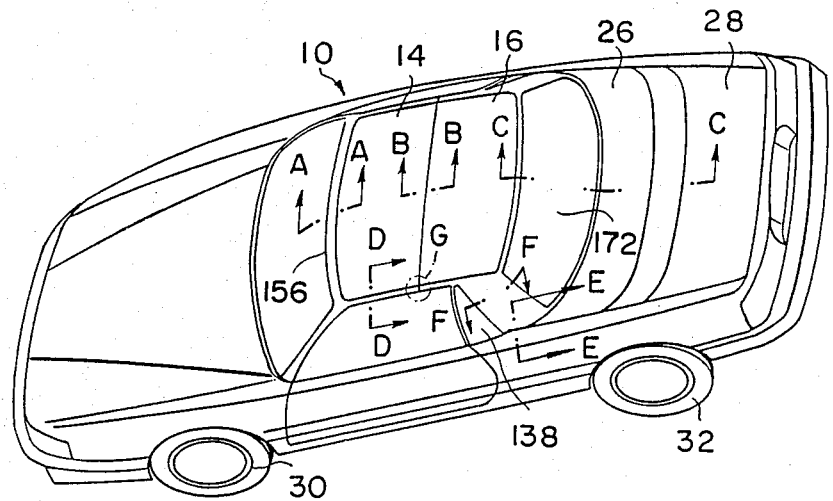
FIG. 20 is a perspective view of the vehicle body similar to FIG. 2A.
Figure 21A:
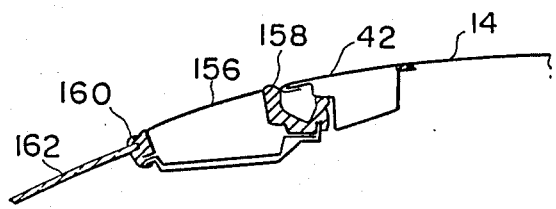
FIG. 21A is a sectional view taken along the line A—A in FIG. 20.

Referring now to FIGS. 20 to 21A, it will be noted that the vehicle body 10 includes a front windshield comprising a front header 156 extending transversely along the front upper corner of the passenger compartment and a windshield glass 162. Between the windshield glass 162 and the front header 156, there is a weather strip 160 for providing a weather tightness. In the extended position of the roof, the front roof panel 14 is engaged at the front edge portion 42 through a weather strip 158 which is attached to the upper edge portion of the front header 156.

Figure 21B:
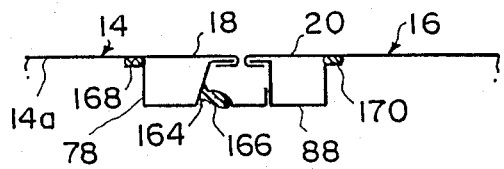
FIG. 21B is a sectional view taken along the line B—B in FIG. 20.

Referring to FIG. 21B, there is shown the arrangement between the front roof panel 14 and the rear roof panel 16. The rear roof panel 16 is provided at the front edge portion 20 with a weather strip 166 which is adapted to be engaged with the inner panel 78 of the front roof panel 14. Further, as shown in FIG. 21B, there are provided further sealing members 168 and 170 between the inner members 78 and 88 of the front and rear roof panels and outer members 14a and 16a of the roof panels 14 and 16, respectively.

FIG. 21C shows the sealing structure in the rear portion. The rear roof panel 16 is provided at the rear portion with a transparent rear glass 172 which is attached to the roof panel 16 through weather strips 174 and 176. The rear roof panel 16 has a lower panel frame 182 which is provided with a weather strip 180. The rear deck cover 26 has a front edge portion 177 which is provided with a weather strip 178. When the rear deck cover 26 is in the closed position, the weather strip 178 of the cover 26 is engaged with the lower panel frame 182 and the weather strip 180 on the frame 182 is engaged with the front edge portion 177 of the rear deck cover 26.

Rearwards the rear deck cover 26, the vehicle body 10 is formed with a rear deck 188 which has a front edge portion 190 provided with a weather strip 186. The rear deck cover 26 has a rear edge portion 184 which is brought into engagement with the weather strip 186 on the front edge portion 190 of the rear deck 188. The rear deck 188 further has a rear edge portion 192 which is provided with a weather strip 194. The trunk lid 28 is engaged at the front edge portion with the weather strip 194.

In FIG. 21D, it will be noted that the front roof panel 14 is provided at each side edge portion with the weather strip 132 as already described and the side window glass 134 on the side door is engaged at the upper edge with the weather strip 132 when the side window is closed. FIG. 21E shows the sealing structure which has already been described with reference to FIG. 15B. In FIG. 21F, it will be noted that the rear roof panel 16 has at each side a rear pillar frame 181 and the rear side glass 138 is attached to the front edge portion of the rear pillar frame 181 through the weather strip 144 as already described with reference to FIG. 13B. The rear glass 172 of the rear roof panel 16 is attached to the rear pillar frame 181 through a weather strip 198.

Referring to FIGS. 21G and 21H, it will be noted that the weather strip 166 which has already been described with reference to FIG. 21B is carried by a rain rail 200 which is provided on the front edge portion 20 of the rear roof panel 16. It will therefore be understood that the rain which has passed through the space between the rear edge portion 18 of the front roof panel 14 and the front edge portion 20 of the rear roof panel 16 flows in the direction shown by arrows 202 and 204.

Figure 22:
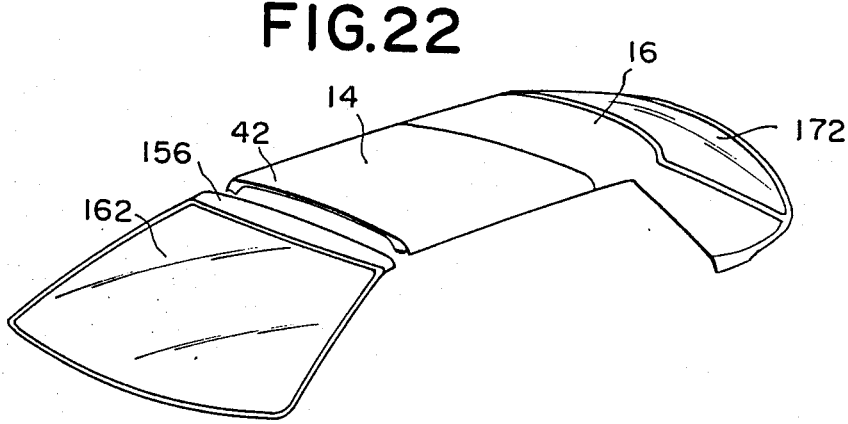
FIG. 22 is a perspective view showing the front and rear roof panels and the front windshield.
Figure 23:
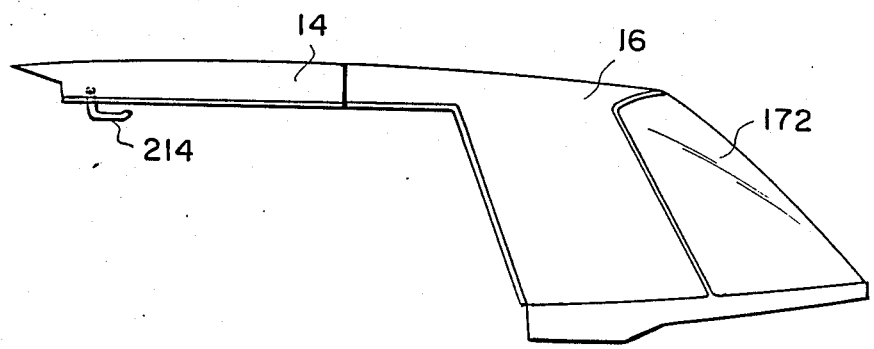
FIG. 23 is a side view of the front and rear roof panels.
Figure 24:
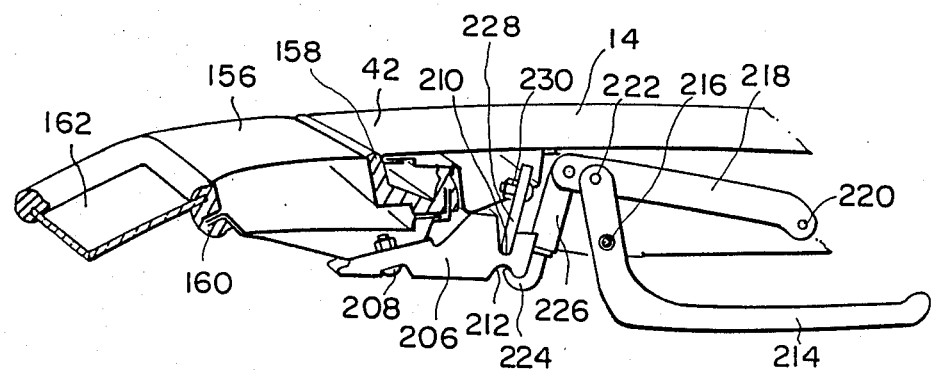
FIG. 24 is a perspective view showing the arrangement of the front roof panel and the front header of the front windshield.

Referring to FIGS. 22 and 23, there are shown general configurations of the front windshield assembly having the aforementioned front header 156 and the front windshield glass 162, the front roof panel 14 having the front edge portion 42 and the rear roof panel 16 having the rear window glass 172. Referring now to FIG. 24, the front roof panel 14 is shown in the position wherein the front edge portion 42 is engaged with the weather strip 158. It will further be noted in FIG. 24 that there is provided a locking mechanism for locking the front roof panel 14 in the extended position to the front header 156.

As shown in FIG. 24, the front header 156 has a hook bracket 206 which is secured to the front header 156 by means of bolts 208. The hook bracket 206 is formed at the upper side with a groove 210 and at the lower side with a groove 212. The front roof panel 14 is provided with a lever 214 which is pivotably mounted on the roof panel 14 by means of a pivot pin 216. The lever 214 is connected at one end with an intermediate portion of a link 218 which is mounted at one end on the roof panel 14 through a pivot pin 220. The connection between the lever 214 and the link 218 is such that the lever 214 has a pin 222 which is engaged with a slot (not shown) in the link 218. The other end of the link 218 is connected with a hook member 226 having a hook 224 which is adapted to be engaged with the groove 212 in the hook bracket 206. The roof panel 14 further has a retaining member 228 which is attached to the roof panel 14 by means of bolts 230. As shown in FIG. 24, the retaining member 228 is adapted to be engaged with the groove 210 in the hook bracket 206 when the front roof panel 14 is in the extended position.

It will therefore be understood that when the front roof panel 14 is positioned so that when the front edge portion 42 is engaged with the weather strip 158 on the front header 156 to place the front roof panel 14 in the extended position the retaining member 228 on the roof panel 14 is engaged with the groove 210 in the hook bracket 206. Then, the lever 214 is actuated to turn the link 218 to have the hook 224 of the hook member 226 engaged with the groove 212 in the hook bracket 206.

Figure 25:
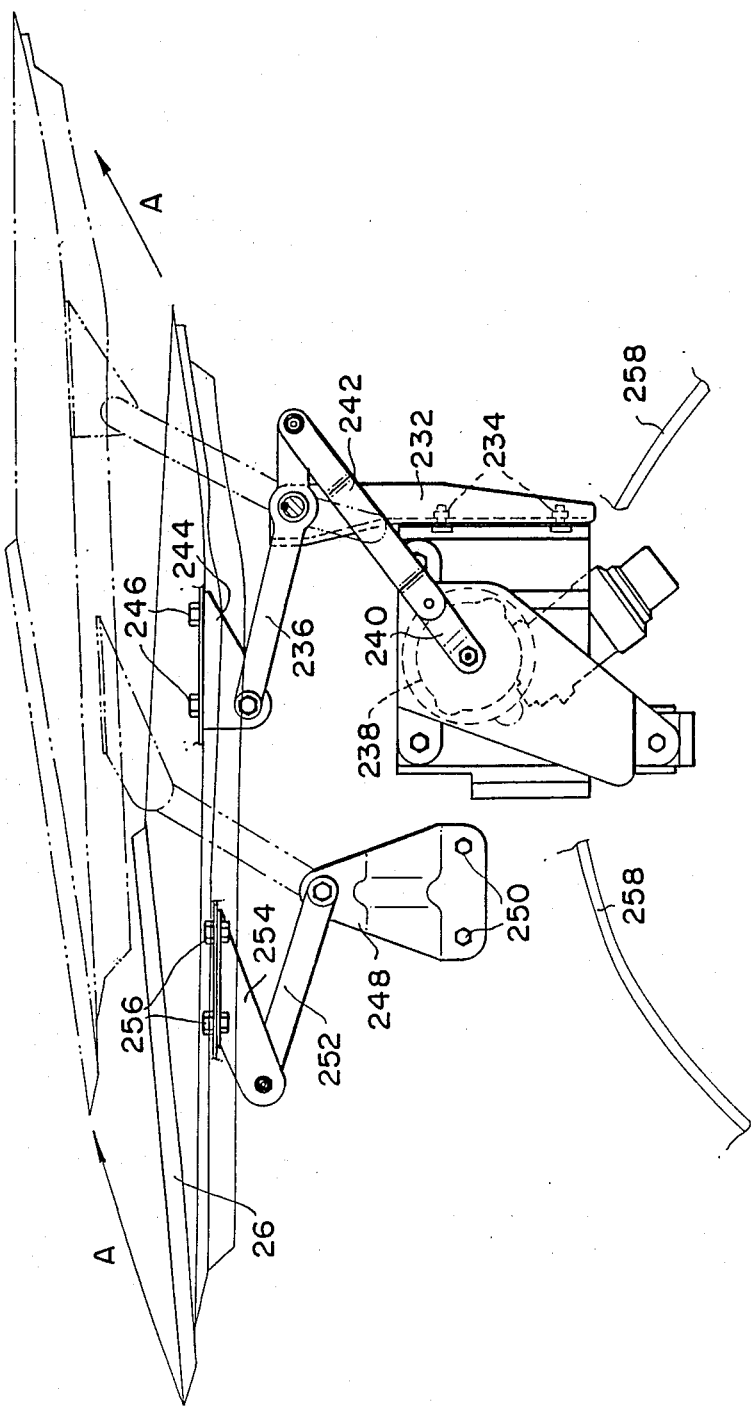
FIG. 25 is a side view showing the rear deck cover actuating mechanism.
Figure 26:
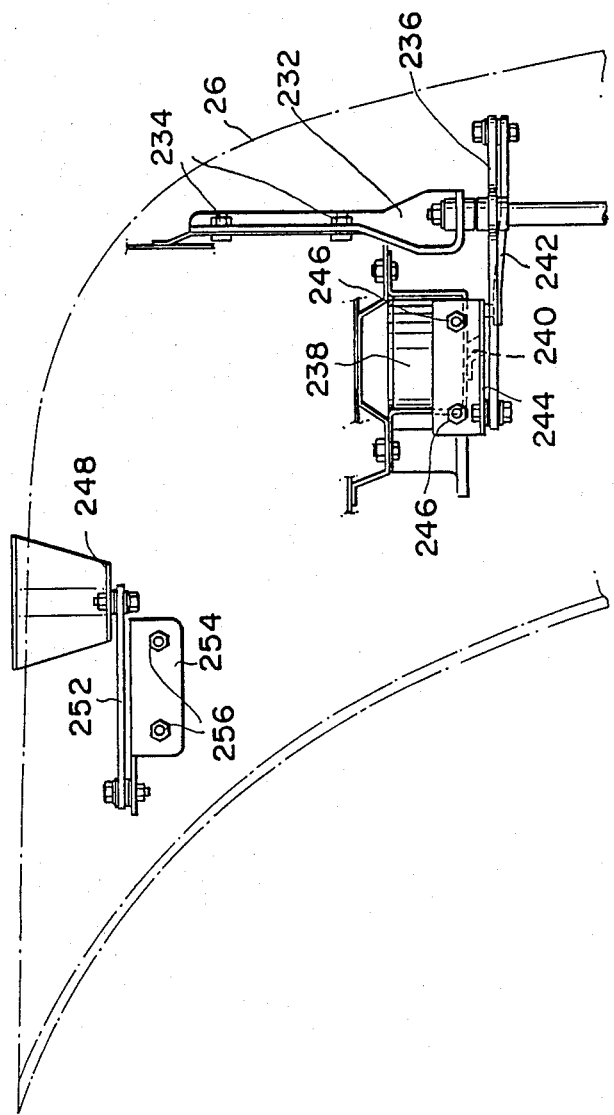
FIG. 26 is a top plan view of the rear deck cover actuating mechanism.

Referring now to FIGS. 25 through 27, there is shown a mechanism for actuating the rear deck cover 26. The mechanism includes a bracket 232 secured to the body by means of bolts 234. A link 236 is pivotably mounted on the bracket 232 and has one end connected with one end of a link 242. An actuating motor 238 is mounted on the body and has an output shaft connected with one end of a link 240 of which other end is connected with the other end of the link 242. The other end of the link 236 is pivotably connected with a bracket 244 which is mounted on the rear deck cover 26 by means of bolts 246.

The vehicle body is further provided with a bracket 248 which is mounted on the body by means of bolts 250. A link 252 is connected at one end with the bracket 248. The other end of the link 252 is connected with a bracket 254 which is mounted on the rear deck cover 26 by means of bolts 256.

The closed position of the cover 26 is shown in FIG. 25 by solid lines. When the motor 238 is operated in this position, the rotation of the motor 238 is transmitted through the links 240, 242 and 236 to the rear deck cover 26 to move the cover 26 in the direction shown by an arrow A. At the same time, the link 252 is also moved to the position shown by broken lines. The reference numeral 258 designates a tire house which is a part of the rear fender.

The invention has thus been shown and described with reference to a specific embodiment, however, it should be noted that the invention is in no way limited to the details of the illustrated structures but changes and modifications may be made without departing from the scope of the appended claims.

We claim:

1. A vehicle body structure including a body having a passenger compartment and a rear body section, retractable roof means for moving between an extended position wherein said roof means covers a top portion of the passenger compartment and a retracted position wherein the roof means is retracted into the rear body section, said roof means having a first rigid roof panel and a second rigid roof panel each having an inner side which faces said passenger compartment when the roof means is in said extended position, folding means for interconnecting said first rigid roof panel at a rear edge portion with a front edge portion of said second rigid roof panel, said second rigid roof panel being mounted on said body for swingable movement about a swingable axis, a linkage having one end connected with said body and the other end connected with said folding means so that said first rigid roof panel is swingably moved with respect to the second rigid roof panel to have the inner side of the first rigid roof panel opposed to the inner side of the second rigid roof panel when the second rigid roof panel is swingably moved in a rearward direction, said first rigid roof panel and said second rigid roof panel being pivotably connected, said folding means being gear means provided on said first and second rigid roof panels, said linkage comprises means for rotating the gear means when the second roof panel is moved toward the retracted position so that the first rigid roof panel is moved with respect to the second rigid roof panel.

2. A vehicle body in accordance with claim 1, in which said first roof panel is provided at said rear edge portion with first bracket means and the second roof panel is provided at said front edge portion with second bracket means, said gear means of the folding means being provided on said first and second bracket means, respectively.

3. A vehicle body in accordance with claim 2 in which said first and second bracket means are pivotably connected with each other.

4. A vehicle body in accordance with claim 2 in which said gear means includes a fixed gear securely provided on said first bracket means and a rotatable gear provided on said second bracket means.

5. A vehicle body in accordance with claim 4 in which said rotatable gear is a sector gear.

6. A vehicle body in accordance with claim 4 in which said fixed gear is a pinion.

7. A vehicle body in accordance with claim 1, in which said second roof panel is provided at a lower portion with roof set bracket means which is pivotably connected at said swingable axis with the rear body section.

8. A vehicle body in accordance with claim 7 in which driving means is provided for driving the second roof panel, said driving means including motor means having output connected through link means with said roof set bracket means at a position offset from said swingable axis.

9. A vehicle body in accordance with claim 1 in which rear seat means is provided in said rear body section, a space being provided rearward said rear seat means for retracting said roof means.

10. A vehicle body in accordance with claim 1 in which said linkage includes a plurality of interconnected link members for connecting said folding means with said body.

11. A vehicle body in accordance with claim 10, in which said first roof panel and said second roof panel are pivotably connected, said folding means being gear means provided on said first and second roof panels.

12. A vehicle body in accordance with claim 11 in which said gear means includes a gear provided on said second roof panel for rotation about a rotation axis, said linkage being connected on one hand with said second roof panel at a position above said rotation axis and on the other hand with said body at a position offset from the swingable axis.

13. A vehicle body in accordance with claim 12, in which said linkage includes a first link connected at one end with said gear on said second roof panel and at the other end with a first joint bracket which is rotatably mounted on said second roof panel, a second link connected link connected at one end with said first joint bracket and at the other end with a second joint bracket which is rotatably mounted on said second roof panel, and a third link connected at one end with said second joint bracket and at the other end with the body for pivotable movement about a pivot axis so that when the second roof panel is moved rearward, the third link is moved rearward to move the second link, whereby the first link is moved rearward to rotate the gear on the second roof panel.

14. A vehicle body in accordance with claim 13 in which said swingable axis, said pivot axis for the third link and a position where said third link is connected with said second joint bracket are located substantially along a straight line in said extended position.

15. A vehicle body in accordance with claim 13 in which said first, second and third links are connected through ball joints at respective ends.

16. A vehicle body in accordance with claim 1 which includes a rear deck cover for covering a space for retracting the first and second roof panels, said rear deck cover being movable between a covering position and a lifted position wherein said cover is lifted from the covering position.

17. A vehicle body in accordance with claim 16 which includes driving means for driving said rear deck cover between said covering position and said lifted position, said driving means including motor means provided on said body and linkage for connecting said motor means with said rear deck cover.

18. A vehicle body in accordance with claim 17 in which a further linkage is provided between said deck cover and the body at a position apart from the driving means.

19. A vehicle body structure including a body having a passenger compartment and a rear body section, retractable roof means for moving between an extended position wherein said roof means covers a top portion of the passenger compartment and a retracted position wherein the roof means is retracted into the rear body section, said roof means having a first rigid roof panel and a second rigid roof panel each having an inner side which faces said passenger compartment when the roof means is in said extended position, folding means for interconnecting said first rigid roof panel at a rear edge portion with a front edge portion of said second rigid roof panel, said second rigid roof panel being mounted on said body for swingable movement about a swingable axis, a linkage having one end connected with said body and the other end connected with said folding means so that said first rigid roof panel is swingably moved with respect to the second rigid roof panel to have the inner side of the first rigid roof panel opposed to the inner side of the second rigid roof panel when the second rigid roof panel is swingably moved in a rearward direction, the second rigid roof panel being connected at an intermediate portion with the body with regard to a longitudinal direction of the body, a front end portion of the second rigid roof panel being positioned in a attitude with the front end portion thereof being higher than a rear end thereof when the second rigid roof panel is in the retracted position, the first rigid roof panel and second rigid roof panel being arranged substantially parallel with each other in the retracted position thereof.

* * * * *